United States Patent Office 3,025,215
Patented Mar. 13, 1962

3,025,215
BIS (8-QUINOLYL CARBONATE) DERIVATIVES
Van R. Gaertner and Robert M. Schisla, Dayton, Ohio, assignors to Monsanto Chemical Company, St. Louis, Mo., a corporation of Delaware
No Drawing. Filed July 29, 1959, Ser. No. 830,180
8 Claims. (Cl. 167—33)

This invention relates to new organic compounds, and to compositions comprising the same, useful as biological toxicants. The invention relates also to methods for preparing the said new compounds.

The new compounds of the invention are of the "bis" type and are derived by reacting 8-quinolinol with glycol bischloroformates in a manner described hereinafter. The said compounds may be described graphically according to the following general formulae:

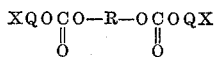

wherein Q represents the 8-quinolyl radical, X represents the hydrogen or methyl radical, and R is a bivalent radical selected from the group consisting of alkylene radicals of from two to ten carbon atoms, alkyleneoxyalkylene radicals of from four to twenty carbon atoms, and polyalkyleneoxy-alkylene radicals of from six to thirty carbon atoms. Representative compounds falling within this general formula are the following:

(A) Compounds containing the bivalent alkylene radical, i.e., —CH$_2$CH$_2$—;

Ethylene bis(8-quinolyl carbonate)
1,2-propylene bis(8-quinolyl carbonate)
1,3-propylene bis(8-quinolyl carbonate)
1,2-butylene bis(8-quinolyl carbonate)
1,3-butylene bis(8-quinolyl carbonate)
1,4-butylene bis(8-quinolyl carbonate)
1,2-hexylene bis(8-quinolyl carbonate)
1,6-hexylene bis(8-quinolyl carbonate)
1,4-octylene bis(8-quinolyl carbonate)
1,6-decylene bis(8-quinolyl carbonate)
1,10-decylene bis(8-quinolyl carbonate)

(B) Compounds containing the bivalent alkyleneoxyalkylene radical, i.e. —CH$_2$CH$_2$—O—CH$_2$CH$_2$—;

2,2'-bis(8-quinolylcarbonyldioxyethyl) ether
3,3'-bis(8-quinolylcarbonyldioxypropyl) ether
2,2'-bis(8-quinolylcarbonyldioxypropyl) ether
2,2'-bis(8-quinolylcarbonyldioxybutyl) ether
3,3'-bis(8-quinolylcarbonyldioxybutyl) ether
4,4'-bis(8-quinolylcarbonyldioxybutyl) ether
2,2'-bis(8-quinolylcarbonyldioxyhexyl) ether
3,3'-bis(8-quinolylcarbonyldioxyhexyl) ether
6,6'-bis(8-quinolylcarbonyldioxyhexyl) ether
4,4'-bis(8-quinolylcarbonyldioxyoctyl) ether
6,6'-bis(8-quinolylcarbonyldioxydecyl) ether
10,10'-bis(8-quinolylcarbonyldioxydecyl) ether (C) Compounds containing the bivalent polyalkyleneoxy-alkylene radical, i.e.,

—CH$_2$CH$_2$O—CH$_2$CH$_2$O—CH$_2$CH$_2$—

Ethylene bis[2 - (8 - quinolylcarbonyldioxy)ethyl] ether
1,3 - propylene bis[3 - (8 - quinolylcarbonyldioxy) - propyl] ether
1,3 - hexylene bis[3 - (8 - quinolylcarbonyldioxy) hexyl] ether
1,6-hexylene bis[6 - (8 - quinolylcarbonyldioxy) hexyl] ether
1,6 - decylene bis[6 - (8 - quinolylcarbonyldioxy) decyl] ether
Bis[2 - (8 - quinolylcarbonyldioxy) - 1 - propoxy - 1 - propyl] ether
Bis[3 - (8 - quinolylcarbonyldioxy) - 1 - propoxy - 1 - propyl] ether
Bis[2 - (8 - quinolylcarbonyldioxy) - 1 - butoxy-1-butyl] ether
Bis[3 - (8 - quinolylcarbonyldioxy) - 1 - butoxy-1-butyl] ether
Bis[4 - (8 - quinolylcarbonyldioxy) - 1 - butoxy - 1 - butyl] ether
Bis[3 - (8 - quinolylcarbonyldioxyl) - 1 - pentoxy - 1 - pentyl] ether
Bis[5 - (8 - quinolylcarbonyldioxyl) - 1 - pentoxy - 1 - pentyl] ether
Bis[4 - (8 - quinolylcarbonyldioxy) - 1 - octoxy - 1 - octyl] ether
Bis[8 - (8 - quinolylcarbonyldioxy) - 1 - octoxy - 1 - octyl] ether
Bis[6 - (8 - quinolylcarbonyldioxy) 1 - decoxy - 1 - decyl] ether
Bis[2 - (8 - quinolylcarbonyldioxy) - 1 - ethoxy - 1 - ethoxy-1-ethyl]ether
Bis[2 - (8 - quinolylcarbonyldioxy) - 1 - propoxy - 1-propoxy-1-propyl] ether
Bis[3 - (8 - quinolylcarbonyldioxy) - 1 - propoxy - 1-propoxy-1-propyl] ether
Bis[5 - (8 - quinolylcarbonyldioxy) - 1 - pentoxy - 1-pentoxy-1-pentyl] ether Additional exemplary compounds within the generic formula are provided where the 8-quinolyl radical of the foregoing specifically named compounds is substituted in the ring structure by methyl, either in the 2,3,4,5,6 or 7, preferably, however, in the 2 position. Those skilled in the art will perceive the remaining compounds falling within the generic formula which are not specifically mentioned herein and will understand that even though such additional compounds are not set out in the above list, they are, nonetheless, included within the invention here described.

In order more fully to describe the new compounds and assure that no questions arise concerning their precise chemical structure, it is desired to set forth the chemical formulae in certain exemplary instances. For this purpose ethylene bis-(8-quinolyl carbonate) is chosen first, it being the simplest in structure of the compounds. Its formula is:

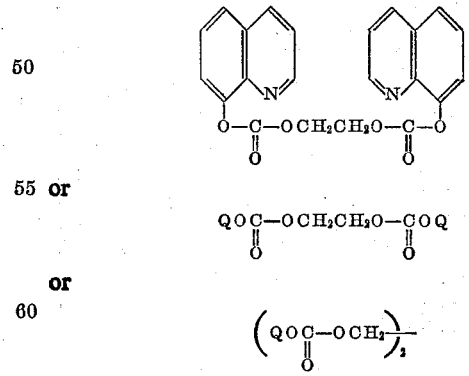

It will be understood that in these formulas and in this specification and the claims herein, the letter Q is employed to designate the quinolyl radical, which radical is as shown below:

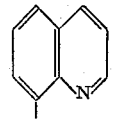

A second compound for which the formula is given as illustrative is 2,2'-bis(8-quinolylcarbonyldioxyethyl) ether, the formula being

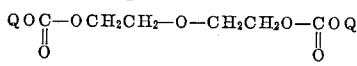

or

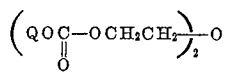

A third compound for which the formula is given as illustrative is bis[2-(8-quinolylcarbonyldioxy)-1-propoxy-1-propoxy-1-propyl] ether

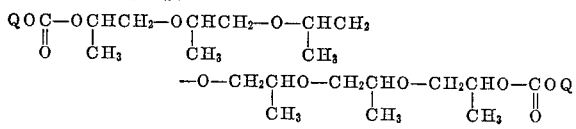

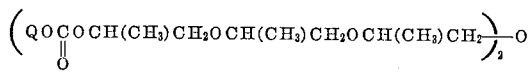

or

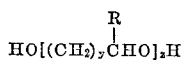

The above described compounds may be prepared by reacting 8-quinolinol (or the methyl substituted derivative thereof as described above) with the dichloroformate of the glycol or glycol ether (i.e.,

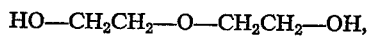

where y is an integer of from one to ten, z is an integer of from one to ten and R is hydrogen or a saturated straight or branched chain hydrocarbon of one to four carbon atoms, e.g., diethylene glycol, $$HO-CH_2CH_2-O-CH_2CH_2-OH,$$

tri-1,2-propylene glycol,

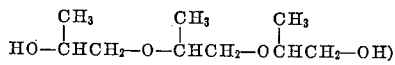

corresponding to the desired carbonate derivative of 8-quinolinol in an appropriate reaction solvent, pyridine being suitable. In conducting the reaction, care should be taken to avoid exothermic overheating as this leads to decomposition of the dichloroformate. This is suitably controlled by icing the reaction vessel. The required amount 8-quinolinol is first dissolved in the solvent (pyridine) and the solution is then charged to the iced reaction vessel. Thereafter, the dichloroformate is added slowly with stirring to the iced solution. When the required amount of dichloroformate has been added, the mixture is allowed to set several hours, suitably overnight, with stirring, after which the pyridine is removed using a water aspirator with mild heating, i.e., about 25–40° C. The residue is then hydrolyzed with 3 N NaOH and washed with ether. Where the product is solid, it is readily filtered from the ether-washed hydrolyzed mixture after which it is again washed with ether and cold water and then dried in a vacuum oven. Where the product is non-solid, i.e., a viscous fluid mass, ether is vacuumed off and the product is heated to remove remaining undesirables such as low boiling carbonates, unreacted 8-quinolinol and pyridine.

*Example I*

8-quinolinol in the amount of 58.0 g. (0.4 mole) and 50.0 g. (0.216 mole) dichloroformate of diethylene glycol in 600 mls. pyridine were reacted according to the foregoing described procedure, the reaction mixture being allowed to stand overnight. The product obtained was a white solid substance (55.8 grams) melting at 110–111° C. and found to be 2,2'-bis(8-quinolylcarbonyldioxyethyl) ether.

*Example II*

8-quinolinol in the amount of 29.0 g. (0.2 mole) and 28.5 g. (0.152 mole) dichloroformate of ethylene glycol in 600 mls. pyridine were reacted according to the above described procedure. The mixture was allowed to stand with stirring for 18 hours after which 33.0 grams of a white solid product were obtained melting at 172–173° C. The product was analyzed and found to be ethylene bis-(8-quinolyl carbonate).

*Example III*

8-quinolinol in the amount of 29.0 g. (0.2 mole) and 27.5 g. (0.1 mole) of the dichloroformate of triethylene glycol were reacted according to the above-described procedure except that excess 1.5 N NaOH was employed in washing the ether extracts to remove unreacted 8-quinolinol and the product was subjected to vacuum distillation at 185–190° C. to effect removal of pyridine, any low-boiling carbonates, and any remaining 8-quinolinol. The product was a dark viscous mass (30.5 g.) boiling at 100–110° C. (0.8–1.0 mm.) and found to be ethylene bis[2-(8-quinolylcarbonyldioxy)ethyl] ether.

As indicated above, the new compounds herein are useful as biologicals. In suitable concentration, they are found to prevent the growth of bacteria and fungi. When employed as toxicants, they may be applied in toxic quantities in any known suitable fashion, either as sprays or dusts. When employed as sprays, they may be applied as emulsions or solutions. When employed as dusts, they may be compounded with inert carriers and diluents as desired, e.g., talc, clay, lime, bentonite, pumice, etc.; moreover, they may be employed with other active materials such as insecticides, fungicides, soaps, detergents and the like.

The following examples are illustrative of the biological activity of the new compounds herein:

*Example IV*

This example shows testing of ethylene bis(8-quinolyl carbonate) against *Staphylococcus aureus* and *Salmonella typhosa*. A one-percent stock solution of the compound in a non-toxic solvent was added to nutrient agar to give test samples containing one part of the compound per 1,000 parts of the agar. Petri dishes were filled with the test mixture and the plates thus prepared were then respectively inoculated with said *Staphylococcus aureus* and said *Salmonella typhosa* organisms and incubated for two days at a temperature of 37° C. At the end of that time inspection of the plates showed complete inhibition of growth of both organisms, while plates not containing the said compound, but otherwise identical and incubated similarly, showed normal uninhibited growth.

*Example V*

This example shows testing of 2,2'-bis(8-quinolylcarbonyldioxyethyl) ether against *Staphylococcus aureus* and *Salmonella typhosa*. A one-percent stock solution of the compound in a non-toxic solvent was added to nutrient agar to give test samples containing one part of the compound per 10,000 parts of the agar. Petri dishes were filled with the test mixture and the plates thus prepared were then respectively inoculated with said *Staphylococcus aureus* and said *Salmonella typhosa* organisms and incubated for two days at a temperature of 37° C. at the end of that time, inspection of the plates showed complete inhibition of growth of both organisms, while plates not containing the said compound, but otherwise identical and incubated similarly, showed normal uninhibited growth.

*Example VI*

Ethylene bis(8-quinolyl carbonate) was tested against the fungus *Aspergillus niger* employing the following testing procedure. A one-percent stock solution of the compound in a nontoxic solvent was made up and this solution was added to sterile, melted dextrose agar in a quantity to give one part of compound per 1,000 parts of agar. After thorough mixing the agar was poured into Petri dishes and allowed to harden. One drop of a spore suspension of the fungus was applied as inoculum for each plate. The inoculated plates were incubated at a temperature of 25° C. for five days. At the end of that time, inspection of the dishes showed complete inhibition of growth of the test fungus, while plates not containing the said compound, but otherwise identical and incubated similarly showed normal uninhibited growth.

*Example VII*

2,2' - bis(8 - quinolylcarbonyldioxyethyl) ether was tested against the fungus *Aspergillus niger* employing the following testing procedure. A one-percent stock solution of the compound in a non-toxic solvent was made up and this solution was added to sterile, melted dextrose agar in a quantity to give one part of compound per 10,000 parts of agar. After thorough mixing the agar was poured into Petri dishes and allowed to harden. One drop of a spore suspension of the fungus was applied as inoculum for each plate. The inoculated plates were incubated at a temperature of 25° C. for five days. At the end of that time, inspection of the dishes showed complete inhibition of growth of the test fungus, while plates not containing the said compound, but otherwise identical and incubated similarly, showed normal uninhibited growth.

*Example VIII*

This example shows testing of ethylene bis[2-(8-quinolylcarbonyldioxy)ethyl] ether against *Staphylococcus aureus* and *Salmonella typhosa*. A one-percent stock solution of the compound in a nontoxic solvent was added to nutrient agar to give test samples containing one part of the compound per 10,000 parts of the agar. Petri dishes were filled with the test mixture and the plates thus prepared were then respectively inoculated with said *Staphylococcus aureus* and said *Salmonella typhosa* organisms and incubated for two days at a temperature of 37° C. At the end of that time, inspection of the plates showed complete inhibition of growth of both organisms, while plates not containing the said compound, but otherwise identical and incubated similarly, showed normal uninhibited growth.

*Example IX*

Ethylene bis[2-(8-quinolylcarbonyldioxy)ethyl] ether was tested against the fungus *Aspergillus niger* employing the following testing procedure. A one-percent stock solution of the compound in a non-toxic solvent was made up and this solution was added to sterile, melted dextrose agar in a quantity to give one part of compound per 10,000 parts of agar. After thorough mixing the agar was poured into Petri dishes and allowed to harden. One drop of a spore suspension of the fungus was applied as inoculum for each plate. The inoculated plates were incubated at a temperature of 25° C. for five days. At the end of that time, inspection of the dishes showed complete inhibition of growth of the test fungus, while plates not containing the said compound, but otherwise identical and incubated similarly, showed normal uninhibited growth.

What is claimed is:

1. A compound of the formula:

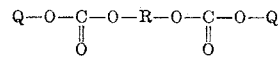

wherein Q represents the 8-quinolyl radical and R is a bivalent radical selected from the group consisting of alkylene of from 2 to 10 carbon atoms, alkyleneoxyalkylene of from 4 to 20 carbon atoms, and polyalkyleneoxy-alkylene of from 6 to 30 carbon atoms.

2. 2,2'-bis(8-quinolylcarbonyldioxyethyl) ether.
3. Ethylene bis-(8-quinolyl carbonate).
4. [2-(8-quinolylcarbonyldioxy)ethyl] ether.
5. A method of inhibiting the growth of fungi and bacteria which comprises contacting the same with a compound of the formula:

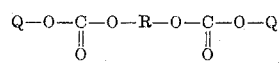

wherein Q represents the 8-quinolyl radical and R is a bivalent radical selected from the group consisting of alkylene of from 2 to 10 carbon atoms, alkyleneoxyalkylene of from 4 to 20 carbon atoms, and polyalkyleneoxy-alkylene of from 6 to 30 carbon atoms in a quantity which is toxic to said fungi and bacteria.

6. The method of inhibiting the growth of fungi and bacteria which comprises contacting the same with the compound 2,2'-bis(8-quinolylcarbonyldioxyethyl) ether in a quantity which is toxic to said fungi and bacteria.

7. The method of inhibiting the growth of fungi and bacteria which comprises contacting the same with the compound ethylene bis-(8-quinolyl carbonate) in a quantity which is toxic to said fungi and bacteria.

8. The method of inhibiting the growth of fungi and bacteria which comprises contacting the same with the compound [2-(8-quinolylcarbonyldioxy)ethyl] ether in a quantity which is toxic to said fungi and bacteria.

No references cited.